United States Patent Office 3,542,627
Patented Nov. 24, 1970

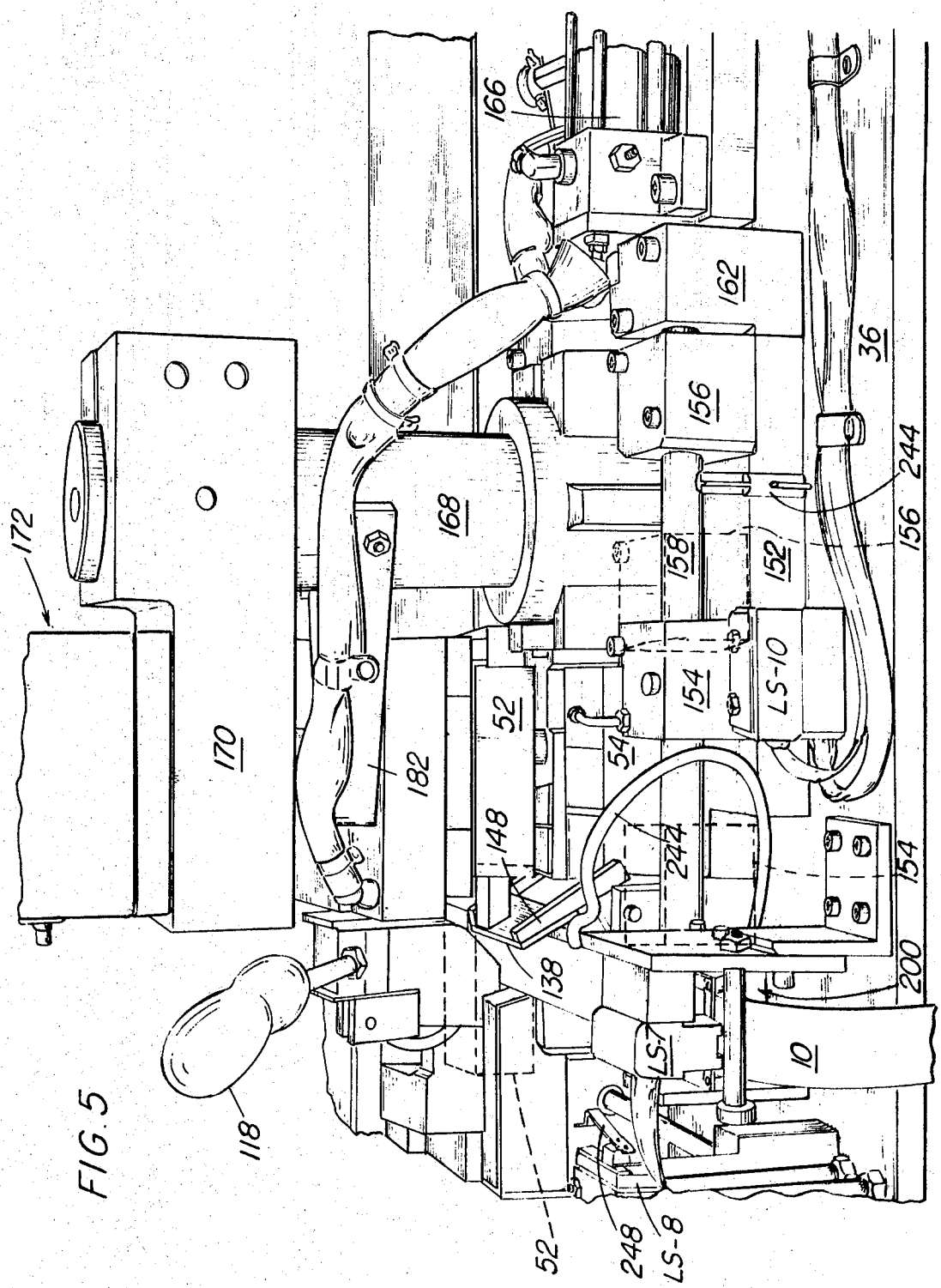

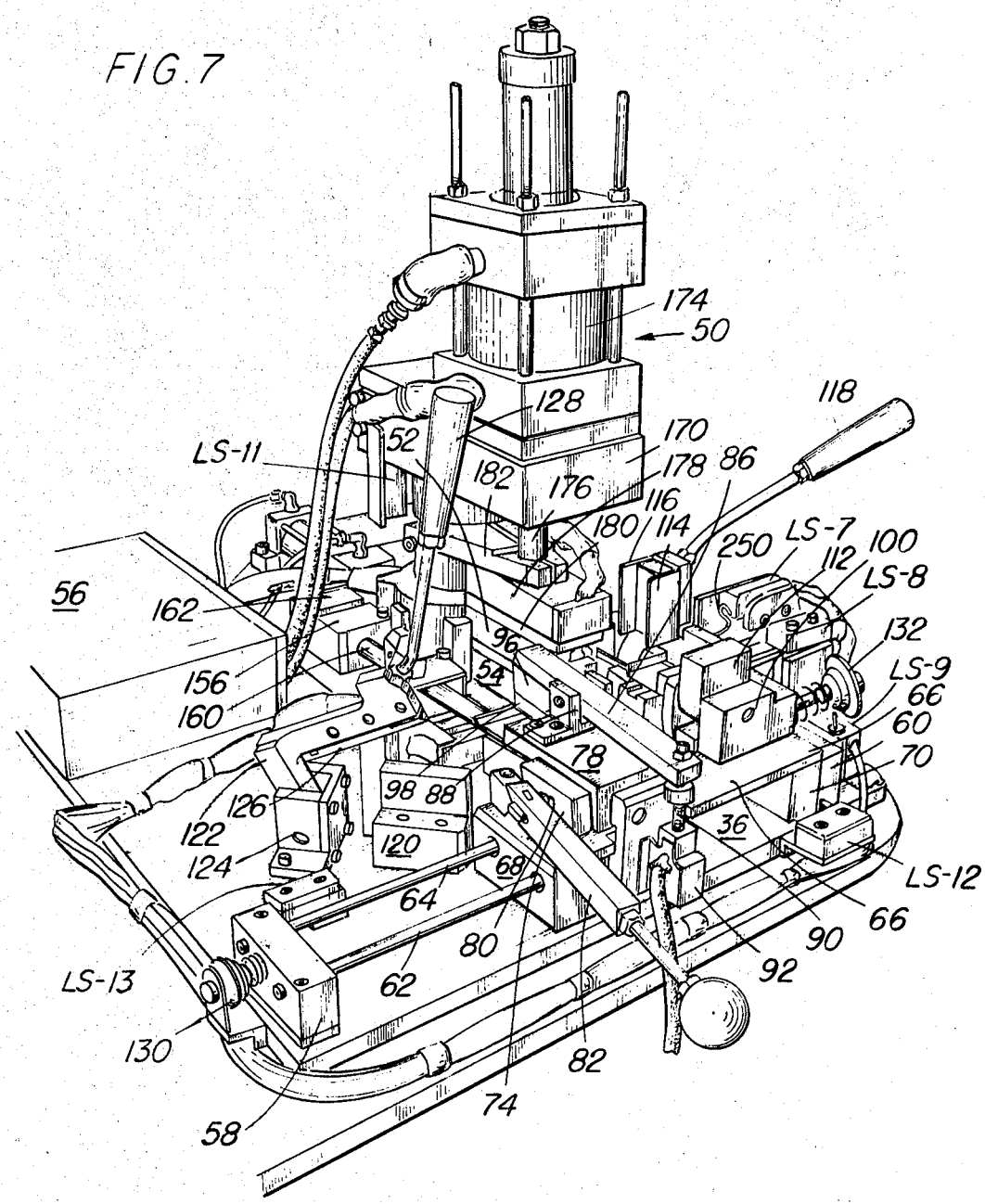

3,542,627
APPARATUS FOR FUSING TOGETHER TWO PIECES OF STRIP MATERIAL
Jerome S. Osmalov and Richard N. Thomson, Richmond, Va., Roger M. Casavant, Thompsonville, Conn., and Richard L. Panicci, Westfield, Mass., assignors to Philip Morris Incorporated, New York, N.Y., a corporation of Virginia
Filed Aug. 2, 1967, Ser. No. 657,963
Int. Cl. B31f 5/00; B32b 31/00
U.S. Cl. 156—502                12 Claims

ABSTRACT OF THE DISCLOSURE

Apparatus for joining together the tail end of a strip of plastic as it leaves a depleted supply reel supplying stock to a continuous operating article forming apparatus to the lead end of a like strip on a full supply reel, in which a clamp grabs and holds the tail end while the lead end is positioned adjacent thereto and held in that position by a second clamp, the two ends thereafter being positioned by shifting a carriage on which the clamps are mounted to a position alongside a heater assembly, the carriage being constructed such that the shifting thereof produces a slight overlap of the tail end on the lead end and also triggers devices which initiate movement of the heater assembly to move heating anvils forming part of the heater assembly into contact with the overlapped ends for applying heat and pressure thereto thereby to cause a plastic working together of the material and effecting a splice of the ends. The heating anvils are released automatically from contact with the splice and the heater assembly is retracted after a predetermined period subsequent to which the splice is cooled. The clamp holding the lead end is then manually released and the carriage shifted to its original position, the movement of the clamp holding the lead end operating a device which releases automatically the clamp holding the tail end freeing the plastic strip to feed from the full supply reel to the article forming apparatus.

BACKGROUND OF THE INVENTION

The present invention relates to apparatus with which changeover from a depleted to a full supply reel of a stock of plastic strip being fed to continuous operating plastic article forming apparatus can be accomplished, thereby avoiding the necessity for either slowing down or shutting down entirely the forming apparatus while replenishment of the stock feed takes place. The apparatus is designed to facilitate splicing together the tail end of a depleted reel and the lead end of a full reel in a minimum of time by fusion together of the material in the respective ends, the apparatus including suitable means for holding the ends in overlapped relation, applying heat and pressure thereto and trimming same after fusion to remove the residue resulting from the coalescence of the materials of the respective ends.

It is known in the prior art to form certain types of articles in a continuous shaped stock thereof, the individual articles being severed from the continuous stock after formation thereof. One such application of the continuous forming method involves making cigarette filters from a continuous strip of material such as paper or plastic, the stock being shaped as a continuous tube with the individual filter units being severed from the continuous tube after formation. In the cigarette industry, it is important that the manufacuring machinery operate on a continuous basis for reasons of economy and to answer the high production demands of that industry. Machinery suited for this purpose is well known in the tobacco industry. However, insufficient attention has been given to developing improved apparatus and methods for surmounting the problem of replenishing the stock feed to the article forming apparatus without interfering with the continued operation of the article forming apparatus. For example, one accepted practice is to stock enough plastic or paper on a single supply reel to provide stock feed for a reasonably long period of time such as two to three days of machinery operation. The machinery is then shut down while changeover to a full supply reel is made. It is also possible to join together the tail end of a depleted supply reel with the lead end of a fresh or full reel while the article forming apparatus is in operating condition as for example, by directing the strip through a bank of idler vertically spaced rollers, the centers of rotation of which are adjusted toward each other to compensate for machinery feed while the splice is being made. However, the splice has to be made while the tail end is on the "fly" and therefore, this must be done very quickly increasing the likelihood that the operator making the splice will not do the job properly. A poor splice can lead to breakage of the joint within the article forming apparatus requiring shut down. Moreover a splice made on the "fly" results in a lap joint or a butt joint with a joiner tape producing in either procedure, a joint section of greater thickness than the parent stock.

The present invention on the other hand, provides splicing apparatus with which changeover from a depleted to a full supply reel for feeding a continuous operating forming machinery can be effected without shutting down the forming machine, or slowing down its normal operating speed, and which provides for the joinder of the stock on a depleted with a full supply reel with a joint that is for all intents and purposes of the same appearance and texture and substantially the same thickness as the parent stock material. This substantial uniformity or homogenity between parent stock material and joint material eliminates the need for later removal of what would normally be a rejectable section of formed product in the continuous formed stock.

SUMMARY OF THE INVENTION

The present invention is concerned with apparatus for splicing together the tail end of a depleted reel of plastic strip and the lead end of a full reel of the plastic strip, the plastic strip constituting the stock feed to a continuous operating article forming apparatus which shapes the plastic strip into a tubular article of continuous length which may thereafter be severed in known manner into individual or plural article lengths. The splicing apparatus includes means operable when the amount of plastic strip remaining on the depleted reel is at a predetermined length to speed up the stock feed rate to the forming apparatus, although the operating speed of the forming apparatus is not changed, to thereby build up or accumulate a reserve of stock for supplying the apparatus during changeover, said means also functioning to turn on current supply to heater irons with which heat and pressure is applied to the tail and lead strip ends for fusing them together, this being done in advance of the actual joinder step to insure that the irons will be at the proper operating condition when needed. When the tail end of the strip from the depleted reel enters the splicing apparatus, a clamp means is operated automatically upon occurrence of that event and grabs the tail end to hold same while the lead end of the plastic strip on the full reel is led into the splicing apparatus, positioned adjacent the tail end, and then clamped as a preliminary to splicing. The splicing apparatus also includes a cuter with which the respective ends are cut at a diagonal to the direction of advance of the strip through the splicing apparatus, leaving the ends in abutting engagement with each other. A slide carriage on which the clamp means are mounted is then shifted from a first operative to a second operative position, the carriage structure being designed in such manner that this movement causes one strip end to slightly overlap the other for a short distance, and also to position the overlapped ends adjacent a heater assembly. The slide carriage on moving into the said second operative position actuates controls which move the heater irons forming part of the heater assembly into contact with high thermal conductivity heating anvils and the latter in turn are moved into tight pressure transmitting contact with the overlapped srip ends. The heat conducted from the heater irons through the heating anvils partially melts the material of the strip ends which coupled with the pressure application causes them to fuse into a contiguous mass effecting a splice between the strip ends. After a predetermined period, a timer unit controlling the application of heat to the strip material triggers circuitry which controls devices operating to cause retraction of the heater assembly and the joined material is then cooled. A trimmer shear mounted on the sliding carriage is then operated by pivoting the shear element thereof in a sweep through the joined material trimming the residue therefrom along a line coincident with the margins of the tail and lead ends of the strip. The clamp holding the lead end of the full reel is then released manually which release action actuates devices operating to release the clamp means holding the tail end of the depleted reel thereby freeing the stock for feeding into the article forming apparatus. The slide carriage is slid back into its first operating position and upon reaching same reorients the control for the roller overspeed drive to set it for a new cycle of operation.

The invention according comprises the features of construction, combination of elements and arrangement of parts, which will be exemplified in the construction hereinafter set forth and the scope of the invention will be indicated in the claims.

BRIEF DESCRIPTION OF THE DRAWINGS

A fuller understanding of the nature and objects of the invention will be had from the following detailed description taken in conjunction with the accompanying drawings in which:

FIG. 4 is a schematic representation of the manner in which the plastic strip feeds from the supply reel through the splicing apparatus and through an accumulator bin prior to making first entry into the article forming apparatus.

FIG. 5 is a perspective view of a major portion of the splicing apparatus as viewed from the right side thereof, illustrating the mechanism with which the heater assembly is moved into operative position to effect the splice of the strip ends, the scale being greater than that employed in any one of FIGS. 1 to 3.

FIG. 7 is a perspective view of the apparatus as viewed from the front side thereof and to the left of center thereof, showing the slide carriage assembly in its right hand or second operative position in which it positions the overlapped strip ends adjacent the heating irons of the heater assembly.

FIGS. 8a through 8d show the successive steps involved in fusing together the tail end of the depleted reel of plastic strip and the lead end of a full reel of said strip.

Throughout the description like reference numerals are used to denote like parts in the drawings.

DESCRIPTION OF THE PREFERRED EMBODIMENTS

Figure 1:
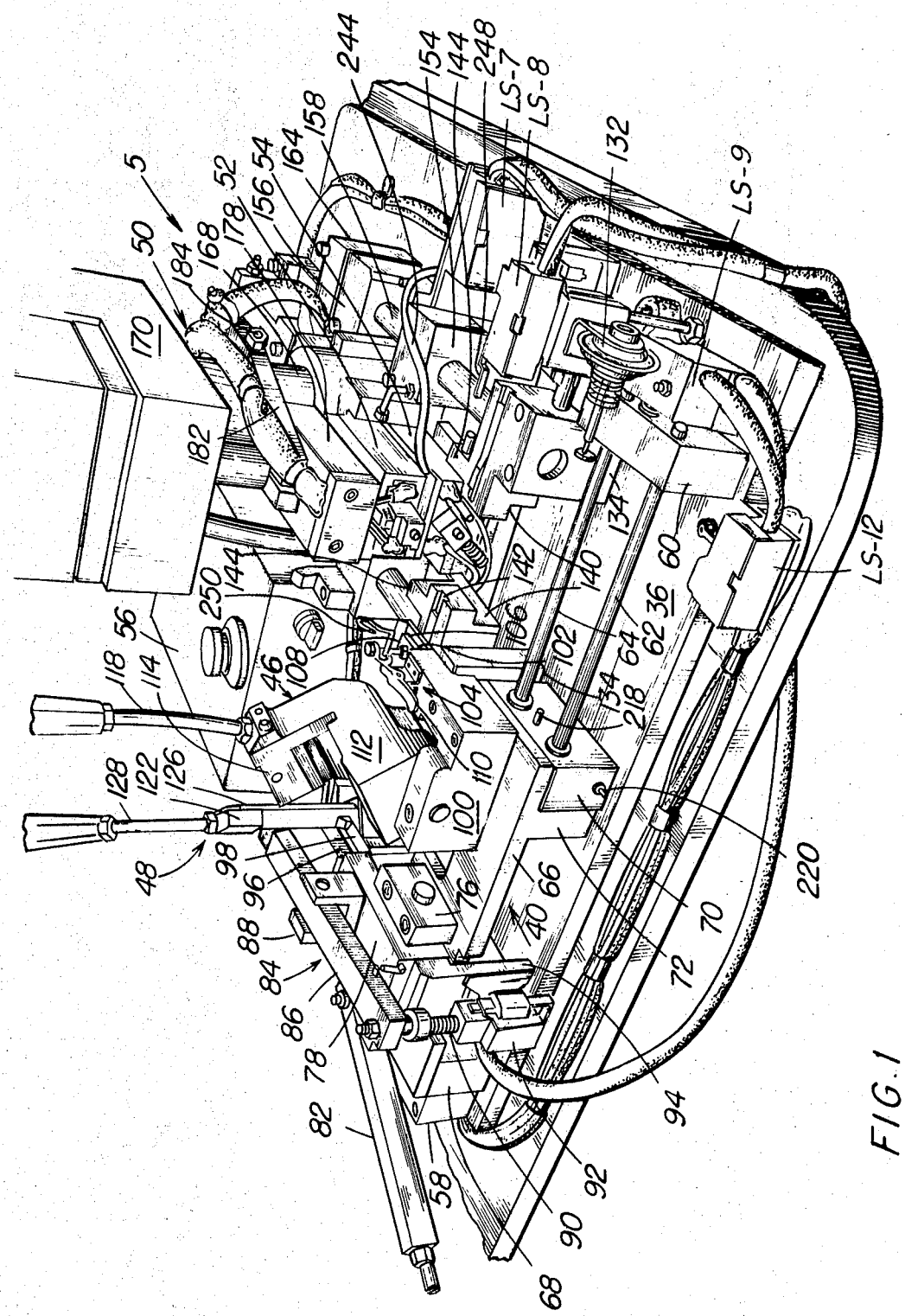
FIG. 1 is a perspective view of the splicing apparatus of the present invention as viewed from the front and to the right of the center thereof, the slide carriage which carries the clamp means being shown in its left hand or first operative position.

The splicing apparatus of the present invention is intended to be used for joining together two strips of fuseable material. In general, it may be used for splicing together the tail end of a strip of plastic strip stock on a depleted supply reel to a lead end of a fresh supply of said stock material, when replenishing stock feed to a continuous operating article forming apparatus, the splice being made without interruption of the normal operation of the article forming apparatus. The splicing apparatus is particularly intended to be used in conjunction with the article forming apparatus described in the patent application of Wesley S. Larson et al., Ser. No. 542,518, filed Apr. 14, 1966 and entitled "Manufacture of Continuous Tubular Article." The method and apparatus described in said patent application are used to produce cigarette filters of special design in a continuous operation, utilizing as a stock feed, a flat strip of plastic which is suitably shaped in the article forming apparatus exiting therefrom as a continuous tubular article. FIG. 4 of the accompanying drawings depicts schematically, the manner in which the stock of plastic strip 10 is fed to the forming apparatus. The plastic strip 10, which can be of various forms of plastic material and is described herein by way of example as being comprised of a strip of polystyrenebutadiene copolymer of approximately 1 and $\%_{16}''$ width, is coiled on a supply reel 12 which when full suffices to supply the forming apparatus with stock for an extended period of operation, as for example, eight hours. The plastic strip 10 on leaving the then feeding supply reel 12 transits through the splicing apparatus 5, the latter being shown only in schematic outline in FIG. 4, and passes through a set of guide rollers 14 and 16, thence through an accumulator bin 18 and on exit from the latter, passes through a set of feed rollers 20 and 22, making first entry to the forming apparatus (not shown) at 24. Thus it will be noted that whenever the article forming apparatus is in operation, the feed of strip 10 thereto will be by way of passage through both the splicing apparatus 5 and the accumulator bin 18. The article forming apparatus operation is preferably carried on with two reels of plastic strip, being always present adjacent the splicing apparatus, one of the reels being the then feeding reel and the second, a spare or full supply reel to be used in changeover when the first becomes depleted. Only the feeding reel 12 is shown in FIG. 4 as the spare reel is of the same construction. The feeding reel 12 has associated therewith a sensing arm 26 which is used in conjunction with switch means to detect the length of plastic strip remaining on the reel at a number of predetermined times just prior to the time the feeding reel becomes completely depleted. To that end, the sensing arm 26 has one end thereof engaging the plastic strip 10 on the feeding reel and is pivoted intermediate its ends as at 28 so as to rotate in a counterclockwise direction as the feeding supply reel 12 depletes. In the course of this rotative movement the other end of the sensing arm 26 will at predetermined times in advance of complete depletion of plastic strip from the feeding reel, successively actuate microswitches 30, 32 and 34 in the manner and for the purpose to be described later in the description, the microswitches being mounted on any suitable support structure, as for example, the structure on which is mounted the sensing arm pivot 28.

Figure 2:
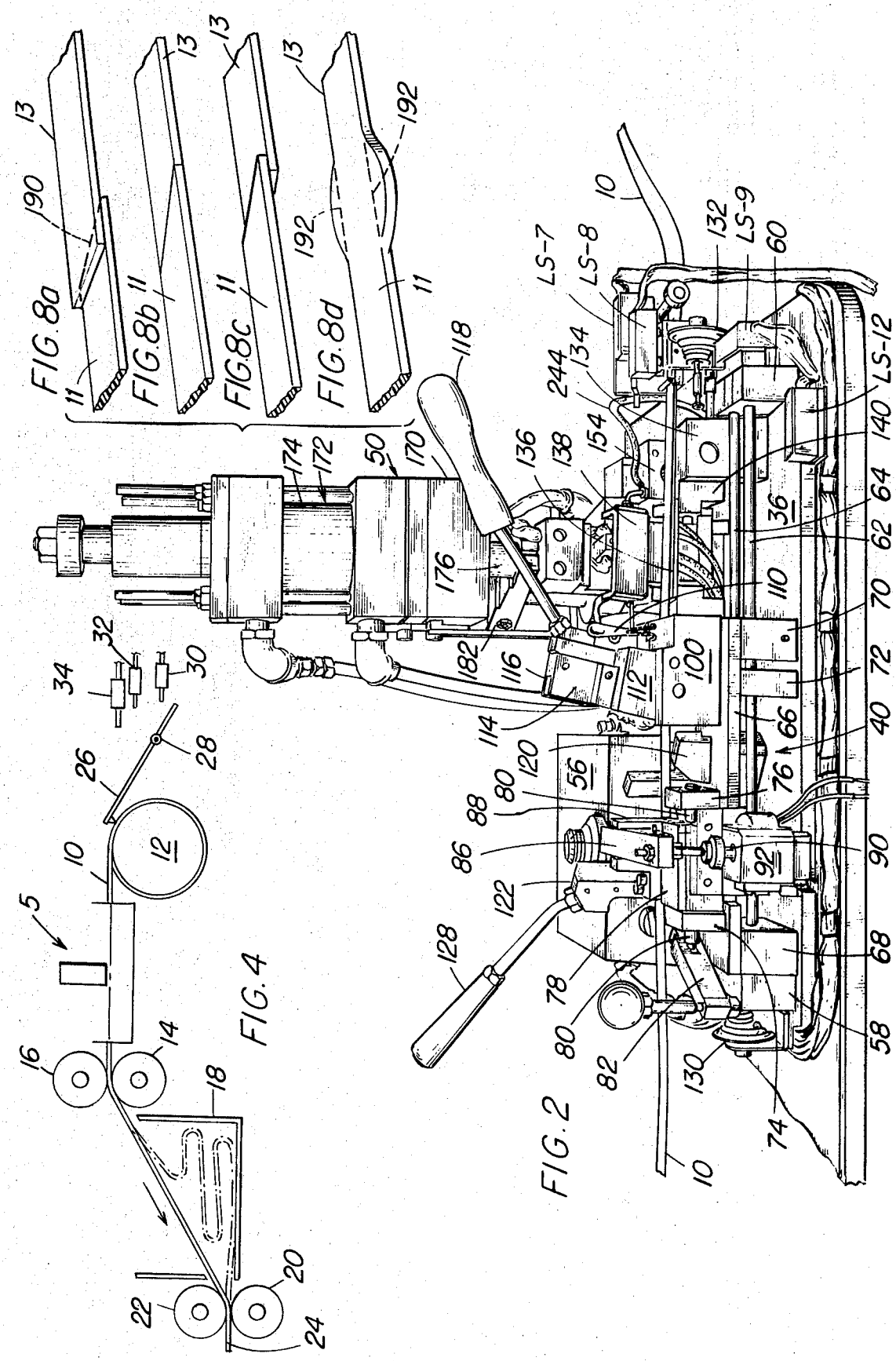
FIG. 2 is a perspective view of the apparatus shown in FIG. 1 as viewed directly from the front thereof and illustrates the course of the plastic strip as it passes through the splicing apparatus in feeding from a supply reel located at the right side to the article forming apparatus located at the left side of the splicing apparatus.
Figure 3:
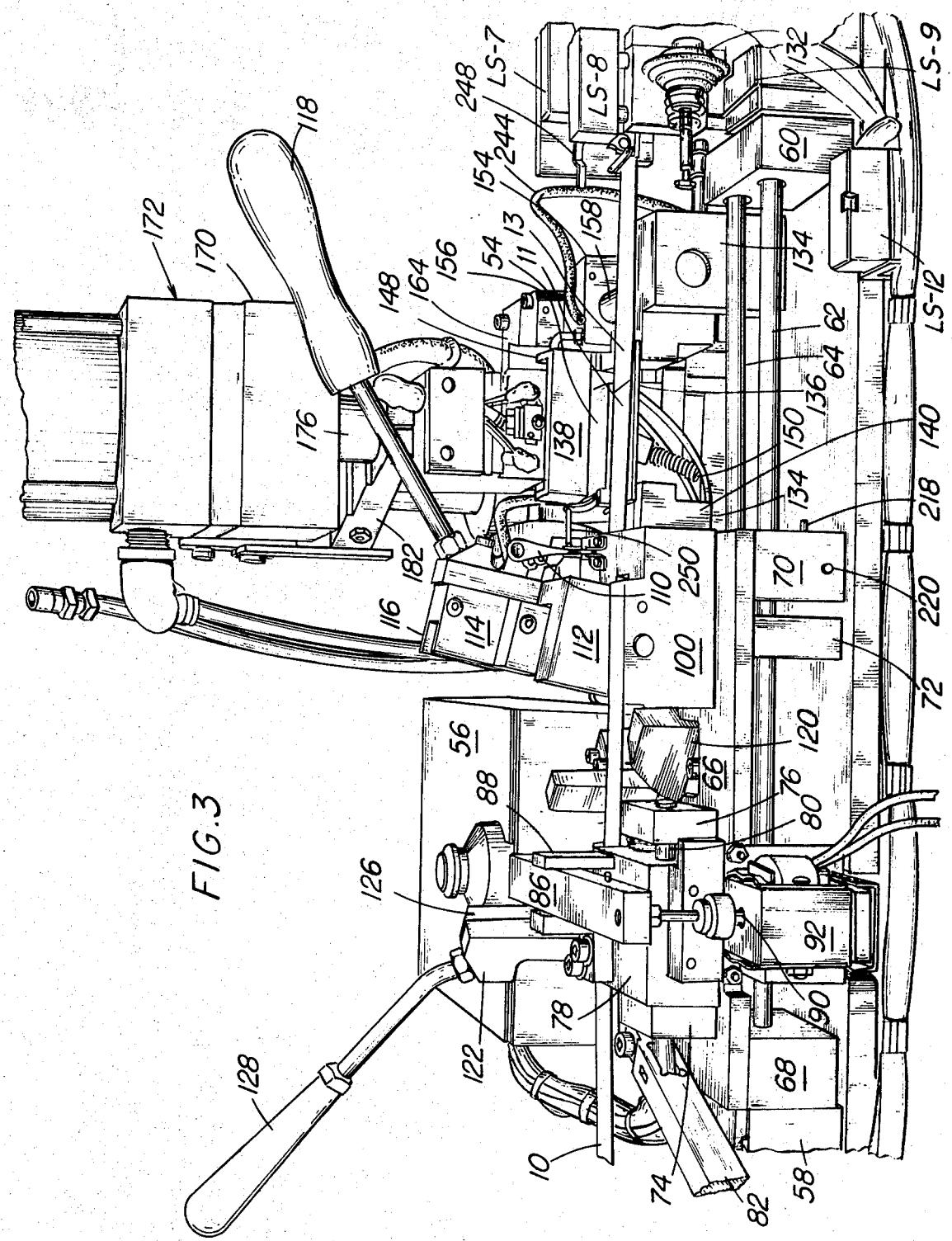
FIG. 3 is a perspective view generally similar to FIG. 2 except it shows the apparatus on a somewhat larger scale and some of the parts thereof are not shown.

Turning now to a consideration of the splicing apparatus per se, continuing reference should be had to FIGS. 1–3 as the component parts of the splicing apparatus are enumerated.

The splicing apparatus 5 is designed to be supported on a suitable base 36 such as a table or generally flat support structure alongside the entry end of the article forming apparatus. The splicing apparatus 5 comprises a number of component assemblies now to be described and each functioning as will appear to perform one or more of the several procedures involved in joining together the strip ends. One such assembly is the slide carriage assembly 40 which includes as part thereof, a clamp 84 for clamping the tail end 11 (see FIG. 8a) of plastic strip after it has left the depleted supply reel 12, and a second clamp 104 with which the lead end 13 (FIG. 8a) of the full reel may be secured within the apparatus preliminary to splicing, and a trimmer device 46 with which residue obtained from fusing together the material of the respective ends is removed from the joined strip ends. A diagonal shear device 48 for shearing the tail and lead ends prior to fusing same is locate behind the slide carriage assembly and is fixed to base 36. Another component assembly of the apparatus is the heater assembly 50 which is positioned behind the slide carriage assembly 40 and which inculdes heater irons 52 and 54, means for sliding the heater assembly forward (laterally of direction of strip feed) to a position wherein the heater irons 52, 54 gird the strip ends and means with which the heater irons can be lowered into operative position to apply heat and pressure to the strip ends. The apparatus also includes a control console 56 in which is housed a timer unit and other control devices and circuitry with which the operation of the splicing apparatus is controlled and which is shown in more detail in the wiring diagram of FIG. 9.

Turning now to a more specific description of the respective structures, the slide carriage assembly 40 is mounted to slide between a lefthand or first operative position (FIG. 1) and a righthand or second operative position (FIG. 7). To provide the foregoing, there is fixed to base 36, a pair of blocks 58 and 60 which receive and support a pair of fixed parallel shafts 62 and 64. The slide carriage assembly 40 includes a platform 66 which is fixed to left and right hand carriage blocks 68 and 70, the carriage blocks being slidable on the shafts 62 and 64. Maximum sliding travel of the slide carriage in the right and left hand directions is limited by engagement of the carriage blocks 68 and 70, respectively, with the opposite faces of an abutment block 72 fixed to base 36. Arranged on top of the left side of platform 66 is a grouping of structure comprised of a pair of fixed journal blocks 74 and 76, and a moveable clamp base block 78. Journaled slidably in the journal blocks 74 and 76 and extending through and fixed to clamp base block 78 is a traversing shaft 80, to the left end of which is fixed a traversing lever 82 by means of which the slide carriage assembly 40 is slid between its two operative positions. As will be noted in FIG. 3, the clamp base block 78 abuts against the left journal block 74 when the slide carriage assembly is in a left hand position. When the traversing lever 82 is manipulated to move the slide carriage assembly to its second or righthand position, the clamp base block 78 will slide to the right and abut against the right journal block 76 and it is only when the latter occurs that actual movement of the slide carriage assembly will take place. This limited independent sliding travel of the clamp base block 78 is used as will appear to overlap the strip ends. Mounted on the clamp base block is a first clamp device 84 located distal from the depleted supply reel and which comprises a lever 86 pivoted as shown to a bracket 88 mounted on the clamp base block 78, the lever being connected at one end with the armature 90 of an electrical solenoid 92, the latter being fixed to a forward extension 94 of the clamp base block 78. The other end of the lever 86 is provided with a jaw 96 which when the lever is pivoted clockwise as viewed in FIG. 1 by energization of solenoid 92, engages against a companion fixed jaw 98 formed as a rearward extension of the clamp base block 78, the plastic strip 10 normally riding on the flat top surface of said fixed jaw 98 as it feeds to the forming apparatus. The clamp device 84 is effective when closed to hold the tail end 11 of the depleted reel plastic strip securely in place to allow for carrying out of the procedures involved in making the splice.

Supported at the right side of the platform 66 is another grouping of structure including a trimmer mounting block 100 secured to platform 66 and having a rearward extension as at 102 on which is mounted a second clamp device 104 located proximate the depleted supply reel and which also includes a fixed lower jaw 106 (formed as part of extension 102) and an upper moveable jaw 108 which can be manually depressed to close the clamp 104 and thereby clamp the lead end 13 of the plastic strip from a full reel. Clamp 104 is closed by pivoting lever 110 downwardly, the construction of clamp 104 and lever 110 being best seen in FIG. 3, which shows clamp 104 in an open position. It will be apparent that during the normal course of operation, that is at times other than when changeover is being made, the plastic strip 10 feeding to the article forming apparatus will ride over the fixed jaw 106 of clamp device 104 also and that its upper jaw 108 as well as that of clamp 84 will be in a raised up or non-engaged position. Trimmer mounting block 100 serves as may be best seen in FIGS. 1 and 3, as the support for receiving trimmer device 46 the latter device including a pivoting body 112 on which is mounted a pair of cutters 114, 116 arranged parallel to each other and which when the carriage is in a righthand position as shown in FIG. 7, can be pivoted by means of pivot lever 118 in a counterclockwise direction to trim the longitudinal edges of the joined strip ends even with the marginal extremities of the parent plastic strip 10 to remove residue accuring from the fusing together thereof.

Figure 6:
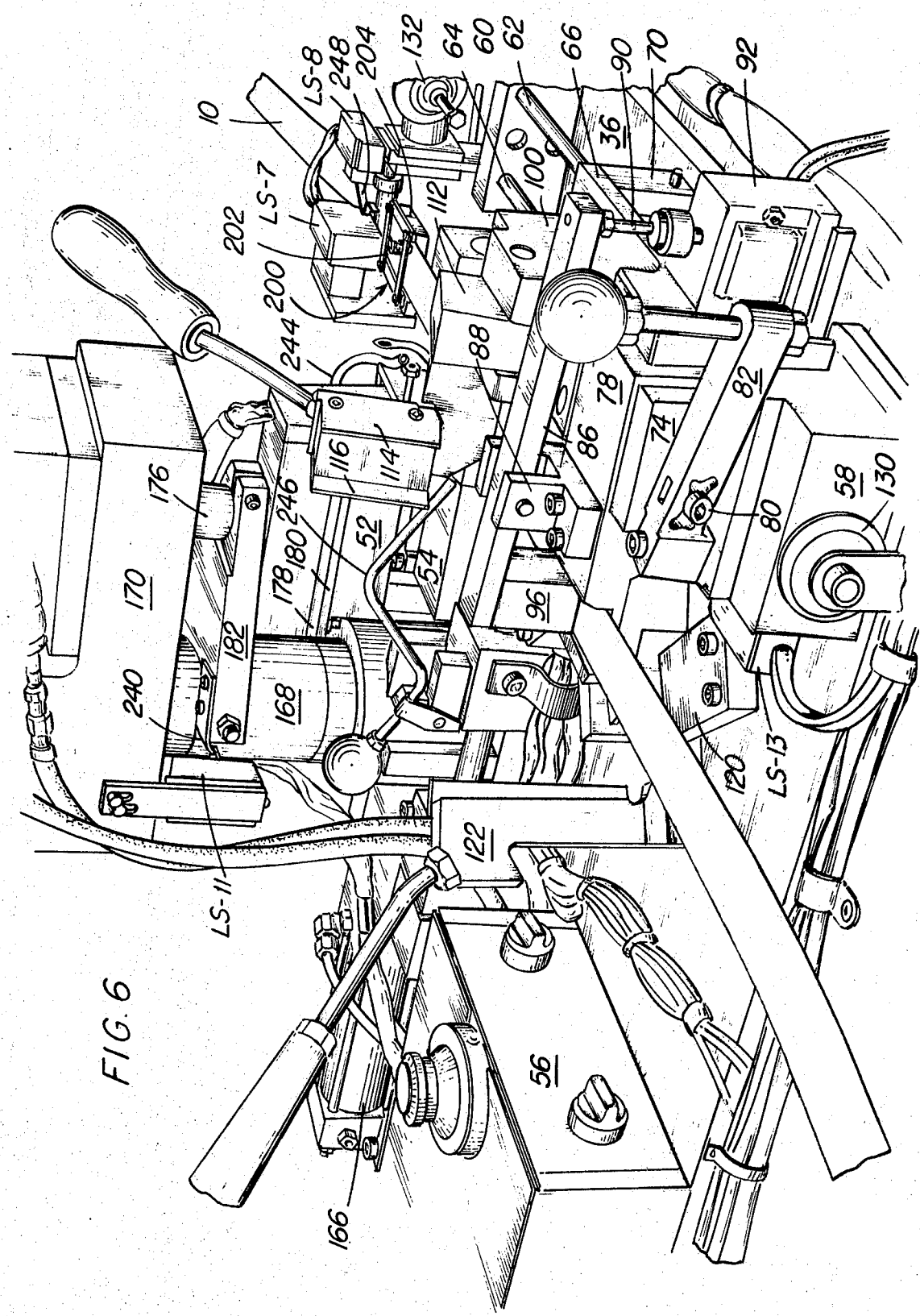
FIG. 6 is a view similar to that of FIG. 5 except as viewed from the opposite or left end of the apparatus and shows in greater detail the construction of the first clamp means, slide carriage assembly and diagonal cutter components.

Mounted behind the slide carriage assembly 40 and fixed to base 36 is a diagonal shear device 48 which as seen best with reference to FIGS. 3 and 6, comprises an anvil 120 fixed to the base 36 and an L shaped pivoting shear arm 122, which is pivoted to base 36 as at 124 and which carries a knife 126 fixed thereto and a lever 128 with which the shear arm 122 can be manipulated to pivot it past the anvil 120 to cut the tail and lead ends of the plastic strips at a diagonal to the axis of strip travel and for the purpose which will be described later on.

Located to the left and right sides of the apparatus and mounted on suitable bracket means provided for that purpose are damping diaphrams 130 and 132 which are struck by trimmer mounting block 100 and carriage block 68, respectively, to absorb the inertia of the slide carriage assembly and bring it to a smooth stop at the end of its movement from its first to second operative positions and vice versa.

To the right of the base 36 and secured thereto just to the rear of fixed shafts 62 and 64 are a set of forward anchorage blocks 134 which form part of the heater assembly structure to be described shortly. The forward anchorage blocks 134 also serve another purpose, i.e., they serve as structure on which is mounted a pair of heating anvils 136 and 138 which are the devices that actually contact the plastic strip ends during fusion to apply heat and pressure thereto and for a reason as will be evident later in the description are made of material with a high thermal conductivity, preferably being made of aluminum. The heating anvils 136, 138 are not shown in FIG. 1 in order that certain structural features of the anchorage blocks 134 can be clearly illustrated. The heating anvils are however shown in FIG. 3. Referring again to FIG. 1, it will be noted that the forward anchorage blocks 134 are each provided with protuberances 140 extending in the direction of strip travel and the tops of which are slotted as at 142, this arrangement providing a seating means for receiving the flat plate like lower heating anvil 136. The forward anchorage blocks also have rearwardly directed segments 144 fitted with pivots 146 on which is mounted an angle section frame 148 to which the upper heating anvil 138 is secured (FIGS. 3 and 5). As can be best seen in FIG. 3, the frame 148 is operatively connected with one end of a tension spring 150 secured to base 36 providing that upper heating anvil 138 is normally pivoted away from the lower heating anvil 136 and it is only when the heater assembly 50 moves forward that the upper heating anvil and the frame 148 supporting same is pivoted to bring the upper heating anvil into contact with the strip ends being joined together.

The heater assembly 50 includes the large upright structure to the rear of shafts 62 and 64 and is provided to produce the heat required for fusing together the strip ends and to embody the means with which that heat and pressure can be applied. It is comprised of a main frame structure which as seen in FIGS. 5–7 includes a platform 152 providing support for a number of other devices and which is adapted to slide on base 36 being capable of movement forwardly from the position shown in FIG. 5 a sufficient distance to locate the upper and lower heater irons 52 and 54 at locations in which they are positioned respectively, above and below the strip ends to be joined. The magnitude of this distance is illustrated in FIG. 5 by means of a showing of moved positions of the upper and lower heating irons 52 and 54 and the heater assembly front and rear support blocks 154 and 156 in dashed lines. The manner in which this forward movement of the heater assembly 50 is effected now will be described. Platform 152 is provided at each side thereof with heater assembly front and rear support blocks 154 and 156, respectively, which are slidable on a pair of shafts 158 and 160, which shafts are fixed in front anchorage blocks 134 and rear anchorage blocks 162, the respective anchorage blocks being fixedly secured to base 36. In this manner the platform 152 and the structure carried thereon can be slid across the surface of base 36. Sliding of platform 152 is effected by means of an air operated ram the piston rod 164 of which is fixed to the rear section of the platform 152, the cylinder 166 in which piston rod 164 slides being secured to the rearmost part of base 36. Extending upwardly from platform 152 and fixed thereto or preferably formed as an integral part thereof is upright post 168. Upright post 168 has connected to the top thereof, a forwardly extending cantilever arm 170 which serves as a support for a second air operated ram 172. Air ram 172 includes cylinder 174 and piston rod 176, the arrangement providing that piston rod 176 strokes vertically when air ram 172 is operated. The lower end of piston rod 176 it will be noted is connected with intermediate plates 178 and 180 and in turn with upper heater iron 52. Thus when piston rod 176 is stroked downwardly with the heating assembly in its forward position, upper heater iron 52 moves into pressure transmitting contact with upper heating anvil 138, the piston rod being supported in the course of its stroking travel by a clevis 182 pivoted to upright post as at 184. Lower heater iron 54 it will be noted is fixed to the forward part of platform 152.

It will be understood that when the heater assembly 50 is stroked forwardly or laterally of the direction of strip travel, the upper heating iron 52 will strike the rear face of the upper heating anvil 138 and pivot it downwardly in the direction of the overlapped strip ends. Heating anvils 136 and 138 are used to directly contact the plastic to insure maximum heat transfer to the plastic material of the strip ends through the high thermal conductivity aluminum and also because the use of aluminum tends to diminish the likelihood of any adhesion of the plastic to the surfaces of the heating anvils as an incident of fusion. Lower heater iron 54 is designed to locate, when the heater assembly 50 is moved forwardly, just below heating anvil 134 with only several thousands of an inch clearance therebetween. Thus when air ram 172 is operated to stroke piston rod 176 downwardly, upper heater iron 52 will press against upper heater anvil 136 with sufficient force to cause deflection of lower heating anvil 134 into good thermal contact with lower heater iron 54. Lower heating anvil 134 has a thickness of about 3/16" so it will be readily appreciated that it is thus capable of undergoing deflection with facility. The aforementioned thus produces an application of pressure or compression of the strip ends which are sandwiched between the heating anvils that coupled with the heating of the material by the heating anvils effectively fuses the strip ends into a contiguous mass. The spacing between the heating anvils when in operative heat transmitting position is substantially 0.015 inch or the equivalent of the thickness of the parent plastic strip. It will be understood that the employment of the heating anvils is a preferred mode of transmitting heat and pressure to the overlapped strip ends by reason of the advantages noted above. However, it is also possible to directly engage the overlapped strip ends with the heater iron and produce a satisfactory fusion together of the strip ends.

A fuller understanding of the splicing apparatus of the present invention will be had from a description of the manner in which a splice is effected with same. Referring again to FIG. 4, when the depleting reel 12 has about 1,000 feet of plastic strip 10 thereon, the sensing arm 26 will have rotated to a position in which it closes microswitch 30. This causes the circuit of the heater irons 52 and 54 to be closed and the latter start to heat up. The operation of the article forming apparatus continues and plastic strip continues to feed from the reel 12. At such time as about 200 feet remain on the reel, microswitch 32 will close and circuitry will become operative to energize a visual alarm 186 and an audible alarm 188 warning the operator that a changeover of supply must be made within a short time. These alarms may then be shut off by the operator by opening an appropriate switch means (not shown). When the length of plastic strip remaining on the reel 12 is down to about 130 feet, the third microswitch 34 is closed and this completes circuitry to positively drive roller 14 at high speed. While roller 14 normally acts as a guide roller, it is adapted to be selectively power driven. This can be done by means of a drive motor and clutching arrangement of conventional construction, the closure of switch 34 being effective to provide power to the motor and also to energize a solenoid controlling clutch engagement. It is assumed for purposes of convenience of description herein that the article forming apparatus is operating at a speed requiring a plastic strip feed thereto at a rate of 65 feet per minute. Thus when there is about two minutes supply of plastic strip on the reel 12, the roller 14 will be driven at a speed up to about twice the operating speed of the article forming apparatus. In the ensuing one minute of time, the entire 130 feet of strip will be removed from the reel. However, only 65 feet will feed into the forming apparatus and the additional 65 feet will accumulate in the accumulator bin 18 in the layer-upon-layer serpentine configuration shown in long and short dashed lines. This will provide feed to the forming apparatus during the one minute during which the changeover from depleted to full reel is made. The layering of the plastic strip within the accumulator bin 18 it will be noted from FIG. 4, is facilitated by reason of the entry of the strip at the top corner thereof whereas exit is by way of a lower diagonally located corner opening.

When the depleted reel 12 becomes fully depleted, i.e., when the "running end" 11 of the plastic strip coiled thereon has entered the splicing apparatus 5, the operation of that apparatus as will be shortly described commences. As a preliminary however, the procedure involved in joining together the strips will be described with reference being made to FIGS. 8a–8e. As seen in FIG. 8a, the joining of the tail end 11 or the "running end" from the depleted reel involves positioning the lead end 13 from a fresh reel of plastic strip in overlapped relation on the tail end. The overlapped ends are then sheared along the shear line 190 shown in dashed lines and which is directed at a diagonal with the direction of travel of the plastic strip. When so sheared, the tail end 11 and lead end 13 will abut with one another along the diagonal edges of the respective ends. However, the respective ends are not fused together when in edge to edge abutment contact as shown in FIG. 8b since this would not provide a contact of sufficient material to ensure a contiguous bond between the respective ends when the material has melted during fusion. Therefore, the two strip ends are placed in a slightly overlapped position as shown in FIG. 8c with the tail end 11 extending a distance of ⅛ inch overlapped on top of the lead end 13. It is while the strip ends are in the position of FIG. 8c that the heating anvils are brought in contact therewith to apply heat and pressure to fuse together the material of the respective ends into a single mass. After fusing, the joined segment will have the appearance as shown in FIG. 8d in which the thickness thereof is substantially the same as that of the parent material in the strip. As a consequence of fusion, and since the fusion occurs while pressure is applied to the respective ends, a certain amount of the fused plastic will protrude laterally of the strip ends in the generally irregular shapes as shown at 192. These protruding masses of plastic are then severed from the joined segment along cutting planes as shown in dashed lines in FIG. 8d which lines are coincident with the marginal extremities of the parent material of the plastic strip.

Figure 9:
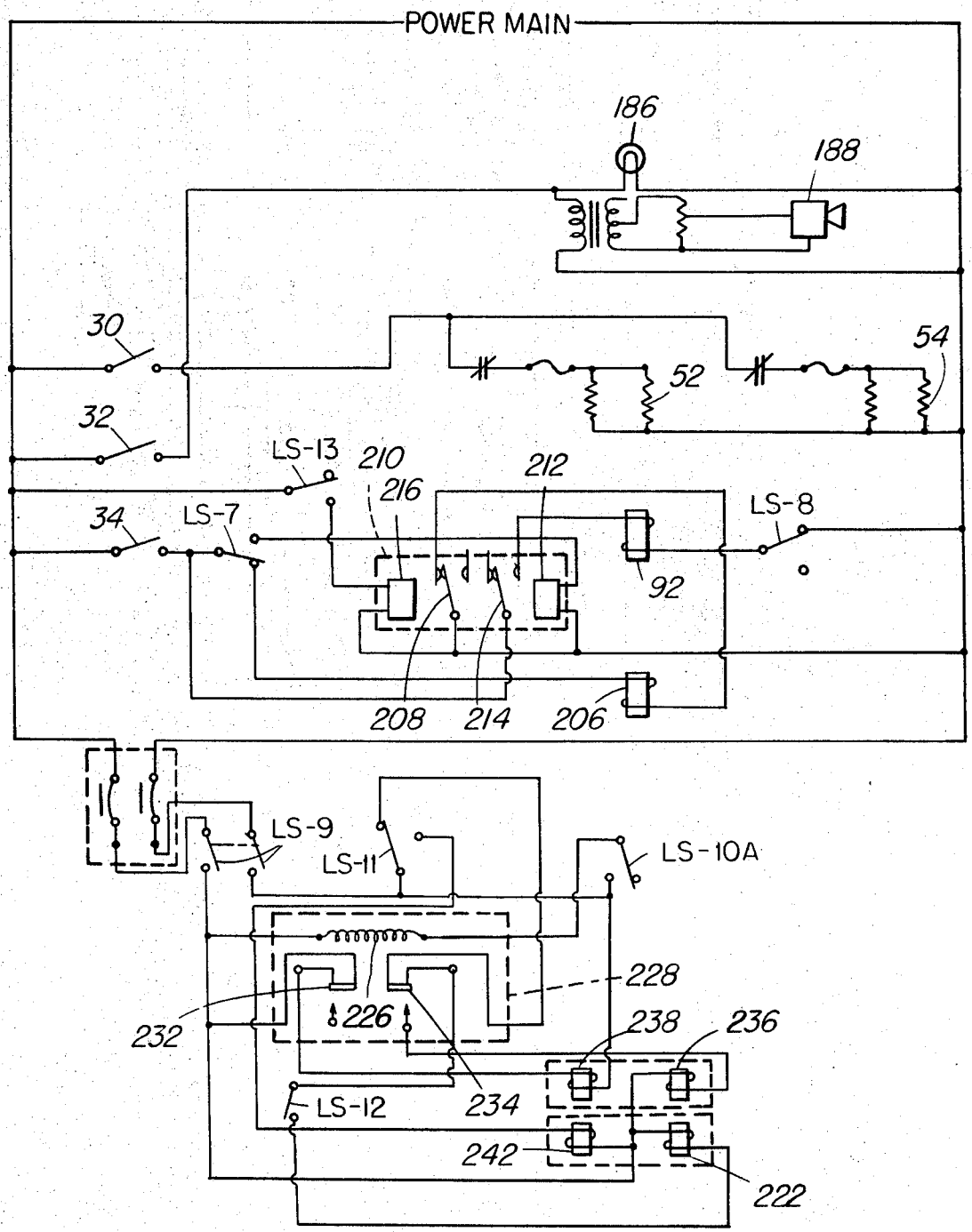
FIG. 9 is a wiring diagram of the electrical circuitry and operating devices of the splicing apparatus.

The electro-mechanical operation of the splicing apparatus 5 now will be described with continuing reference being made to the wiring diagram of FIG. 9. The plastic strip 10 in feeding through the apparatus makes entry thereto by way of a portal frame 200 located at the right side of base 36 (FIG. 6). Mounted on the portal frame 200 is a portal switch LS–7 which has a switch arm 202 thereon normally held in the lower contact position, as seen in FIG. 9, by the presence of the plastic strip on top of portal track 204 forming part of the portal frame. It will be assumed that the operating state is that at the point where microswitches 30, 32 and 34 have closed. When the microswitch 34 was closed, the roller overspeed drive solenoid 206 became energized by connection with system power through portal switch LS–7 and the left contact set 208 of latching relay 210, both contact sets of the latter normally being in the left hand position as shown at the beginning of the splicing cycle. As soon as the tail end 11 of the plastic strip leaves the reel 12 and passes out from under portal switch LS–7, the latter will be oriented to its upper contact position. This change of switch condition of switch LS–7 deenergizes roller overspeed drive solenoid 206 but on the other hand energizes the right hand solenoid 212 of latching relay 210 so that its contact sets 208 and 214 are pulled over to the right-hand position which thereby completes a circuit to energize the solenoid 92 of clamp 84. Clamp 84 thus closes and grabs and holds the tail end 11 in the apparatus. Switch LS–7 thus serves to detect the departure of the tail end from the depleted reel and is effective to initiate operation of clamp 84. The arrangement is such that clamp 84 grabs the tail end when the terminal edge thereof is in a position intermediate the clamp 84 and clamp 104. Latching relay 210 is a "pull" type device, that is, energization of its respective solenoids 216 and 212 is effective to pull the respective contact sets 208 and 214 in corresponding directions, but the latching relay 210 includes no spring loading means to alter the contact positions when the solenoids 216 and 212 are deenergized. The operator now inserts the lead end 13 from a full supply reel of plastic strip into the apparatus directing it through the portal frame 200. The latter action will reposition switch LS–7 in the down position but this is not effective to open the circuit to the solenoid 92 of the clamp unit 84 since as previously mentioned it will only be when latching relay solenoid 216 is energized that the contact sets 208, 214 will be pulled back to the left hand position. Nor does this change in the state of switch LS–7 result in energization of roller overspeed drive solenoid 206 since the energizing circuit thereof is open at contacts 208. Switch unit LS–13, fixed to base 36 at the left side thereof (FIG. 7) will perform that function but only after the splicing operation is completed and in the manner as will be enumerated toward the end of the present description. The operator now closes clamp 104 to hold the lead end 13 securely overlapped with the tail end 11 on the slide carriage assembly 40. Diagonal shear 48 is then used to cut excess material from the respective strip ends as previously described and the operator manipulates traversing lever 82 to slide the slide carriage assembly from its FIG. 1 to FIG. 7 positions. As the slide carriage assembly completes travel into the latter position, the striker pin 218 carried on carriage block 70 will actuate switch LS–9 located at the side of base block 60, closing it and connecting the heater assembly electrical devices with power in the manner now to be described. It will be noted at this point that carriage block 70 carries a second striker pin 220 which is associated with the operation of switch LS–12, the latter being positioned in front of switch LS–9 at the right side of base 36.

Switch LS–12 is but momentarily closed when the slide carriage assembly is moved to the FIG. 7 position so that it opens immediately upon passage of striker pin 220 beyond the associated switch tripping arm. During this period in which switch LS–12 is momentarily closed, system power is applied through switch LS–9 to solenoid 222 which controls air ram operation for moving the heater assembly 50 forwardly. The energizing path it will be noted is through switch LS–9 to the high side of solenoid 222 and from the low side of the solenoid 222 through switch LS–12, contact 234 and switch LS–11 to switch LS–9. Thus the heater assembly 50 commences its forward movement as slide carriage assembly 40 reaches and abuts against the right hand stop and at which point switch LS–12 has gone through a close-open cycle. The forward movement of the heater assembly positions the heater irons 52 and 54 in girding position over the heating anvils 136 and 138, the upper heating anvil 138 pivoting downwardly as previously described. When the heater assembly 50 moves forwardly a striker dog 224 on the side of heater assembly platform 152 closes switch LS–10 fixed to base 36 at the right side of platform 152. As in the case of switch LS–12, the closure of switch LS–10 is momentary and the switch opens immediately upon passage of striker dog 224 beyond the associated switch tripping arm, the close-open cycle occurring just before the forward movement of the heater assembly 50 is completed. By this momentary closure of switch LS–10, power is applied to thermal time delay relay 228 for an instant, thereby energizing the heating coil 226 thereof such that the contacts 232 and 234 are displaced from the upper position to the lower position. As a consequence of this change of position of contact 234, solenoid 236 is energized. The energizing path it will be noted is through switch LS–9 to the high side of solenoid 236 and from the low side of solenoid 236 through contact 234, switch LS–11 to switch LS–9. Solenoid 236 controls operation of an air valve (not shown) connected to air ram 172 which strokes piston rod 176 downwardly moving the heater iron 52 into tight pressure transmitting contact with upper heating anvil 138, causing also the lower heating anvil 138 to deflect against lower heater iron 54. The strip ends sandwiched between the closed heating anvils are immediately heated and subjected to pressure application, it taking about 5 seconds for the plastic to partly melt and coalesce into a contiguous mass under the impetus of the applied pressure. The heat output of heating coil 226 having been dissipated by this time, the contacts 232 and 234 of thermal time delay relay 228 return to the upper contact position. Upon the movement of contact 232 in its upper position, power is applied to solenoid 238. The energizing path it will be noted is through switch LS–9 and through contact 232 to the high side of the solenoid and from the low side thereof directly to switch LS–9. Solenoid 238 controls operation of another air control valve (not shown) which strokes piston rod 176 upwardly raising heater iron 52. In the course of the upward travel of piston rod 176, striker arm 240 on clevis 182 secured to piston rod 176 acts in the same manner as the striker arms 220 and 224 which actuated switches LS–12 and LS–10 so as to momentarily open switch LS–11, the latter being connected to the side of cantilever arm 170 (FIG. 6). Thus, switch LS–11 goes through a momentary open-close cycle as the heating anvils are opened. This momentary opening of switch LS–11 energizes solenoid 242. The energizing path it will be noted is through switch LS–9 and through switch LS–11 to the high side of solenoid 242 and from the low side of solenoid 242 directly to switch LS–9. Solenoid 242 controls an air valve (not shown) for striking piston rod 164 rearwardly to thereby move heater assembly 50 back away from the vicinity of the heating anvils 136 and 138.

The operator now directs a cooling jet of air from a cooling line 244 (FIG. 3) onto the heating anvils 136, 138 to cool same and in turn the plastic mass of joined strip ends. The control and air supply source utilized in this procedure are of conventional form and hence are not shown in the drawings. The operator then raises upper heating anvil 138 in the event tension spring 150 has not functioned to that end using for this purpose lever arm 246 (FIG. 3) connected to upper heating anvil 138 in the manner as shown. The operator then trims off the excess plastic at the sides of the joint by manipulating trimmer unit 46. The joinder of the strip ends is now complete and there remains only to release the clamp units holding the joined strip ends, and return the slide carriage assembly 40 to its first operative position. It will be best noted from FIGS. 3 and 5 that a switch LS–8 is mounted on the splicing apparatus adjacent the portal frame 200 and that it has a blade like spring arm 248 extending from the switch housing, toward the left side of the apparatus. When the slide carriage assembly 40 was moved from its first operative to second operative position earlier, the hook-shaped striker member 250 extending laterally, rightwardly from clamp 104 did not strike or engage with spring arm 248 because the clamp 104 was in a closed position and the arrangement is designed to provide that switch LS–8 is actuated only when the clamp 104 is released with the slide carriage assembly in its second operative position. However, when the operator now releases clamp 104, striker member 250 will pivot against spring arm 248 and open switch LS–8 (move it to down position as viewed in FIG. 9). Thus solenoid 92 is deenergized and clamp 84 opens freeing completely the joined strip ends and feed to the forming apparatus from the full reel will commence as soon as the stock previously accumulated in bin 18 is used up. The operator now returns the slide carriage assembly 40 from its second operative position (FIG. 7) to its first operative position (FIG. 1) and as the carriage assembly moves leftwardly, switch LS–9 opens. As the slide carriage rides home into its first position, switch LS–13 is momentarily moved from its upper to lower position which allows solenoid 216 in latching relay 210 to pull the contact sets 208, 214 thereof over to the left position. In this manner the roller over-speed drive solenoid 206 is capable of being energized at the beginning of the next splicing cycle.

It will be seen from the foregoing that the apparatus of the present invention provides for splicing together two plastic strips in a very efficient manner and in less than one minute. Moreover the apparatus is ideally suited for use in making a splice when replenishing the stock feed to a continuous article forming apparatus since the latter apparatus need not be shut down or slowed down during the time the splice is being made. Those skilled in the art will readily appreciate that certain of the hand operative devices of the apparatus could be automated. For example, a feed device operative responsely to the operation of the first clamp 84 could be used to automatically feed the lead end of a fresh reel of plastic strip into the splicer unit and upon entering same, clamp 104 be automatically closed. Similarly the release of the clamp 104 at the end of the splicing operation could be controlled so as to automatically open upon the rearward movement of the heater assembly 50.

While there is above disclosed but one embodiment of the splicing apparatus of the present invention, it is possible to produce still other embodiments without departing from the scope of the invention concept herein disclosed, and accordingly it should be understood that all matter contained in the above description or shown in the acompanying drawings should be interpreted as illustrative and not in a limiting sense.

What is claimed is:

1. Apparatus for splicing the tail end of a running strip of plastic feeding from a depleted supply reel supplying stock to a continuous operating article forming apparatus to the lead end of a like strip coiled on a full supply reel located adjacent the depleted reel, said apparatus comprising:

a base, first and second clamp means through which the running strip feeds supported on said base at locations which are, respectively, distal and proximate the depleted supply reel, detection means operable to sense the departure of the tail end from the depleted reel, said first clamp means being operable to clampingly hold the running strip, said detection means being effective to initiate operation of said first clamp means when the terminal edge of the tail end is intermediate said first and second clamp means, said second clamp means being aligned with said first clamp means and being operable to clampingly hold the lead end of the plastic strip on the full reel when the latter is advanced through said second clamp means and positioned overlapped with the tail end from the depleted reel, a heater assembly adjacent the depleted supply reel supported on said base, said heater assembly including structure located to one side of the direction of travel of the running strip and embodying spaced upper and lower heater elements, said structure being slidable on said base laterally of the direction of travel of the running strip for moving said upper and lower heater elements into operative positions wherein they are located respectively above and below the overlapped tail and lead ends, and means for vertically displacing at least one of said heater elements in the direction of the other while in operative position and into contact with said overlapped tail and lead ends to conductively transmit heat and compressive force to said tail and lead ends for fusing them together.

2. The apparatus of claim 1 wherein said first and second clamp means are mounted on a slide carriage assembly shiftable longitudinally of the direction of the travel of the running strip between a first operative position distant from said heater assembly to a second operative position wherein the overlapped tail and lead ends are positioned juxtaposed with the structure of said heater assembly embodying the heater elements.

3. The apparatus of claim 2 further comprising a diagonal shear device connected to said base at a location which is adjacent said slide carriage assembly when said slide carriage assembly is in its first operative position, said diagonal shear device being adapted to be manipulated to cut the overlapped tail and lead ends along a common cutting line extending diagonally to the direction of travel of the running strip for producing corresponding abutting edges on the tail and lead ends, said first clamp means being mounted on said slide carriage assembly for limited independent sliding travel thereon in the direction of said second clamp means whereby the tail end held by said first clamp means can be overlapped with the lead end held by said second clamp means when said slide carriage assembly is moved from its first operative position to its second operative position.

4. The apparatus of claim 3 wherein said first clamp means comprise a fixed jaw and a moveable jaw, said moveable jaw being connected with the armature of an electrical solenoid, the latter when energized moving said moveable jaw to a closed position, said detection means comprising a first switch means having an arm engageable with the running strip feeding from the depleted reel, said arm being depressed by the engagement of the running strip therewith, the passage of said running strip beyond said contact arm releasing said arm and changing the condition of said first switch means, said first switch means controlling a device for energizing said electrical solenoid.

5. The apparatus of claim 4 wherein said first switch means is mounted on a portal frame connected to said base adjacent the depleted supply reel, the feeding strip making first entry to the apparatus through said portal frame.

6. Apparatus for splicing the tail end of a running strip of plastic feeding from a depleted supply reel supplying stock to a continuous operating article forming apparatus to the lead end of a like strip coiled on a full supply reel located adjacent the depleted reel, said apparatus comprising:
   a base,
   first and second clamp means through which the running strip feeds supported on said base at locations which are, respectively, distal and proximate the depleted supply reel, said first and second clamp means being mounted on a slide cariage assembly, detection means operable to sense the departure of the tail end from the depleted reel, said first clamp means being operable to clampingly hold the running strip and comprising a fixed jaw and a movable jaw, said moveable jaw being connected with the armature of an electrical solenoid, the latter when energized moving said moveable jaw to a closed position, said detection means comprising a first switch means mounted on a portal frame connected to said base adjacent the depleted supply reel, said feeding strip entering the apparatus through said portal frame, said first switch means having an arm engageable with the running strip feeding from the depleted reel, said arm being depresed by the engagement of the running strip therewith, the passage of said running strip beyond said contact arm releasing said arm and changing the condition of said first switch means, said first switch means controlling a device for energizing said electrical solenoid, said detection means being effective to initiate operation of said first clamp means when the terminal edge of the tail end is intermediate said first and second clamp means, said second clamp means being aligned with said first clamp means and being operable to clampingly hold the lead end of the plastic strip on the full reel when the latter is advanced through said second clamp means and positioned overlapped with the tail end from the depleted reel,
   a heater assembly adjacent the depleted supply reel supported on said base, said heater assembly including structure located to one side of the direction of travel of the running strip end embodying spaced upper and lower heater elements, said structure being slidable on said base laterally of the direction of travel of the running strip for moving said upper and lower heater elements into operative positions wherein they are located respectively above and below the overlapped tail and lead ends, said slide carriage assembly being shiftable longitudinally of the direction of the travel of the running strip between a first operative position distant from said heater assembly to a second operative position wherein the overlapped tail and lead ends are positioned juxtaposed with the structure of said heater assembly embodying the heater elements, and
   means for vertically displacing at least one of said heater elements in the direction of the other while in operative position in order to apply therewith a compressive force and transmission of heat therefrom to the overlapped tail and lead ends for fusing them together,
   the opening of said second clamp means with said slide cariage assembly in its second operative position being effective to actuate means for deenergizing said electrical solenoid thereby opening said first clamp means.

7. The apparatus of claim 6 wherein said second clamp means is provided with a striker member, the means for deenergizing said electrical solenoid comprising a second switch means mounted adjacent said portal frame, said second switch means having an arm extending adjacent said second clamp means when said slide carriage assembly is in its second operative position, said second switch means being in circuit with said electrical solenoid, said striker arm depressing said contact arm when said second clamp means is in closed position, the opening of said second clamp means releasing said contact arm and changing the condition of said second switch means to open the circuit to said electrical solenoid.

8. The apparatus of claim 2 wherein said heater assembly further comprises upper and lower heating anvils connected to said base at a location juxtaposed with the structure of said heater assembly embodying the heater elements, the overlapped tail and lead ends locating above said lower heating anvil when said slide carriage assembly is moved to its second operative position, said upper heating anvil being pivoted to said base, the upper heating element of said structure in the course of its lateral movement pivoting said upper heating to a position on top of the overlapped tail and lead ends, said lower and upper heater elements in operative position locating respectively below and above said lower and upper heating anvils, the vertical displacement of one of said heater elements in the direction of the other forcing said heating anvils into engagement with the overlapped tail and lead ends.

9. The apparatus of claim 8 wherein said heating anvils are made of a good thermally conductive material.

10. The apparatus of claim 2 further comprising a shear cutter asembly pivoted on said slide carriage assembly for movement in a plane parallel to the direction of the travel of the running strip, said shear cutter assembly being positioned between said first and second clamp means and having parallel cutters adapted for trimming residue from the longitudinal edges of the fused together tail and lead ends.

11. The apparatus of claim 2 wherein the sliding movement of the heater asembly structure embodying said heater elements to move said heater elements to an operative position is effected with a first power operated device, the movement of said slide carriage to its second operative position actuating a control device for initiating operation of said first power operated device.

12. The apparatus of claim 11 wherein the means for vertically displacing at least one of said heater elements is a second power operated device, the movement of said heater assembly structure embodying said heater elements actuating another control device for initiating operation of said second power operated device.

References Cited
UNITED STATES PATENTS

| | | | |
|---|---|---|---|
| 2,582,581 | 1/1952 | Bona | 156—502 |
| 3,015,600 | 1/1962 | Cook | 156—497 |
| 3,136,678 | 6/1964 | Herzig | 156—506 |
| 3,186,891 | 6/1965 | Gelling et al. | 156—510 |
| 3,266,968 | 8/1966 | Von Gunten | 156—368 |
| 3,306,801 | 2/1967 | Giles | 242—58.3 |

BENJAMIN A. BORCHELT, Primary Examiner

D. A. HART, Assistant Examiner

U.S. Cl. X.R.

156—583, 497